United States Patent [19]

Hauk

[11] Patent Number: 5,043,011

[45] Date of Patent: * Aug. 27, 1991

[54] PROCESS FOR PRODUCING PIG IRON

[75] Inventor: Rolf Hauk, Düsseldorf, Fed. Rep. of Germany

[73] Assignee: Deutsche Voest-Alpine Industrieanlagenbau GmbH, Düsseldorf, Fed. Rep. of Germany

[*] Notice: The portion of the term of this patent subsequent to Apr. 3, 2007 has been disclaimed.

[21] Appl. No.: 472,308

[22] Filed: Jan. 30, 1990

Related U.S. Application Data

[63] Continuation of Ser. No. 788,621, Oct. 17, 1985, Pat. No. 4,913,733.

[30] Foreign Application Priority Data

Feb. 5, 1986 [DE] Fed. Rep. of Germany ....... 3603894

[51] Int. Cl.$^5$ .............................................. C22B 1/10
[52] U.S. Cl. ...................................... 75/446; 75/10.22
[58] Field of Search ............................... 75/446, 10.22

[56] References Cited

U.S. PATENT DOCUMENTS

| | | |
|---|---|---|
| 3,853,538 | 12/1974 | Nemeth . |
| 4,019,895 | 4/1977 | Santen . |
| 4,225,340 | 9/1980 | Beggs et al. . |
| 4,260,412 | 4/1981 | Summers et al. . |
| 4,317,677 | 3/1982 | Weber et al. . |
| 4,412,858 | 11/1983 | Viramontes-Brown et al. . |
| 4,543,123 | 9/1985 | Vuletic . |
| 4,591,380 | 5/1986 | Summers et al. . |
| 4,755,219 | 7/1988 | Hauk ...................................... 75/445 |
| 4,913,733 | 4/1990 | Hauk ...................................... 75/491 |

FOREIGN PATENT DOCUMENTS 0094707 5/1983 European Pat. Off. .
2843303 12/1982 Fed. Rep. of Germany .

Primary Examiner—Melvyn J. Andrews
Attorney, Agent, or Firm—Locke, Reynolds, Boyd and Weisell

[57] ABSTRACT

A process for producing pig-iron is described involving the use of a reduction shaft furnace 1 and a melt-down gasifier 2. The sponge iron produced from iron ore in the reduction shaft furnace is fed into the melt-down gasifier and converted into a pig-iron melt. The gas produced in the melt-down gasifier is passed as reducing gas into the reduction shaft furnace both via a cyclone separator 11 and a line 12 and directly via a line 13. The top gas leaving the reduction shaft furnace, after passing through a scrubber 4, is largely returned via a $CO_2$ scrubber 6, in which $CO_2$ and $H_2O$ are removed from the top gas, in such a way that it can be used for forming the reducing gas in the melt-down gasifier and also as a cooling gas for the reducing gas produced in said gasifier.

6 Claims, 1 Drawing Sheet

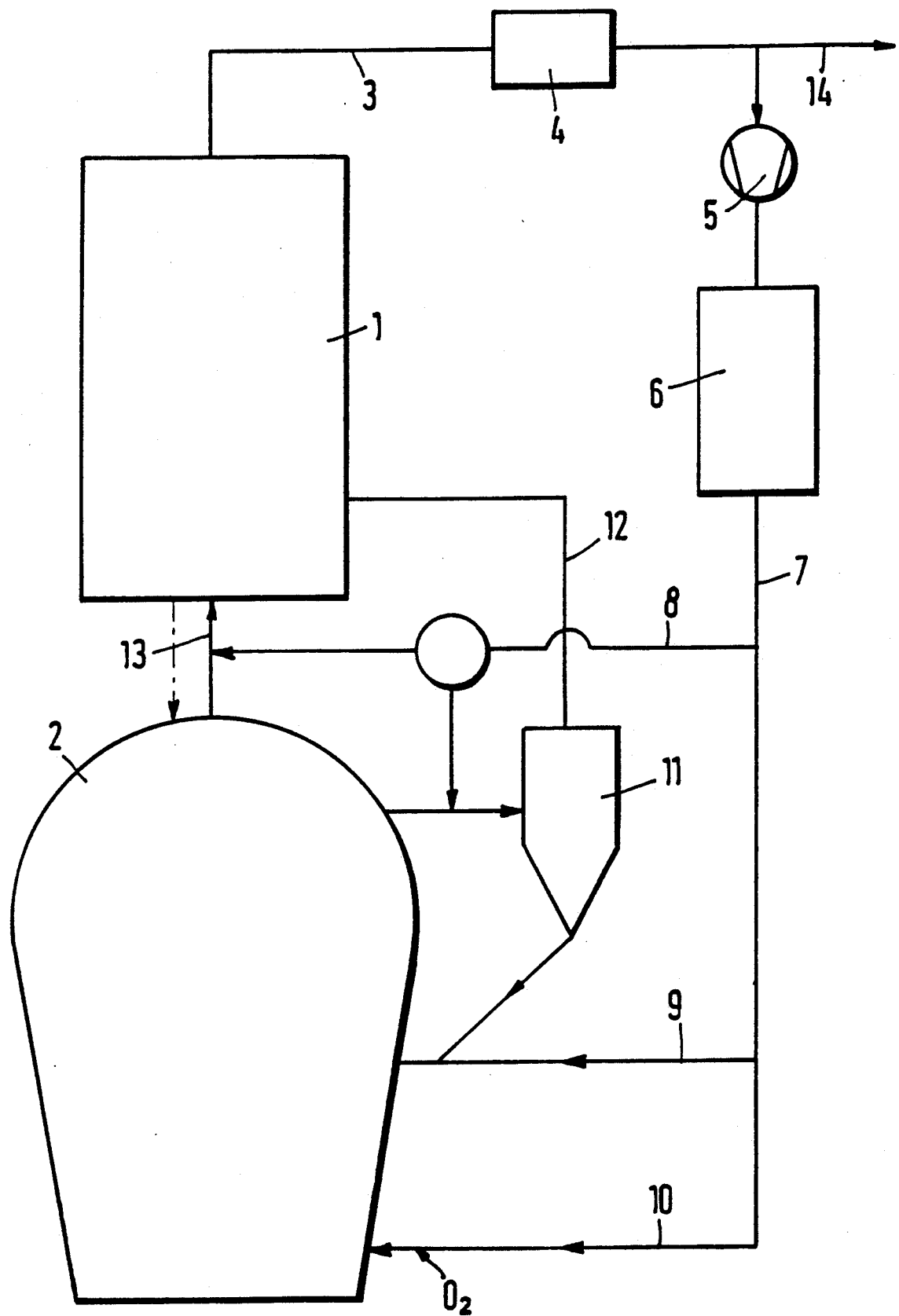

PROCESS FOR PRODUCING PIG IRON

This is a continuation of application Ser. No. 06/788,621, filed Oct. 17, 1985, now U.S. Pat. No. 4,913,733.

The invention relates to a process for producing pig-iron, in which the iron ore is reduced in a reduction shaft furnace and the sponge iron obtained as a result thereof is subsequently melted in a melt-down gasifier, a carbon carrier and a reducing gas being introduced into said gasifier and the gas produced in the latter is passed as reducing gas into the reduction shaft furnace.

German Patent 28 43 303 discloses a process for producing molten pig-iron and reducing gas in a melt-down gasifier, in which sponge iron particles are melted down to molten pig-iron or steel raw material and the heat necessary for melting and the reducing gas are produced from coal supplied and oxygen-containing gas blown in above the melt. In this process a relatively large amount of surplus gas (export gas) is obtained and the energy consumption, i.e. the consumption of coal and oxygen is very high. If the surplus gas cannot be economically used, the pig-iron production costs are very high. The chemical energy in the surplus gas is more than 50% of the energy supplied with the coal, and the utilization of the reducing gas produced in the melt-down gasifier is max. 44%.

It is known from U.S. Pat. No. 4,225,340 to substantially free the top gas of a reduction shaft furnace from carbon dioxide and use the thus treated top gas for producing fresh reducing gas. This is supplied to the starting gas of a fossil fuel-processing gasifier, a gas reactor connected downstream of the gasifier, and also the starting gas for the gas reactor both directly and via a gas heater. The starting gas of the gas reactor with the admixed treated top gas is passed in the form of reducing gas to the reduction shaft furnace. However, this known process is only used for producing sponge iron without the use of a melt-down gasifier.

A similar sponge iron production Process is known from U.S. Pat. No. 4,260,412. In the latter, once again top gas of a reaction shaft furnace treated by carbon dioxide removal is used for producing fresh reducing gas. The gas producing means is a fluidized bed gasifier, to which is supplied the treated top gas, coal and lime, as well as oxygen and optionally steam.

The starting gas of this gasifier is admixed with the treated top gas both directly and via a gas heater, before it is Passed into the reduction shaft furnace. Thus, this process also functions without a melt-down gasifier for the Production of pig-iron.

The problem of the present invention is to provide a process of the aforementioned type in which the consumption of coal and oxygen is considerably reduced.

According to the invention this problem is solved in that the top gas of the reduction shaft furnace is at least partly freed from oxidized components $CO_2$ and $H_2O$ and the thus treated top gas is fed into the melt-down gasifier. According to an advantageous development of this process, the treated top gas is added to the gas produced in the melt-down gasifier and passed into the reduction shaft furnace, as a cooling gas. Preferably a total of 50 to 95% and more specifically 85% of the top gas is to be returned for reducing gas production. In addition, only that amount of surplus gas (export gas) is to be produced to enable the compressor of the $O_2$ plant to be operated and/or to produce steam for $CO_2$ scrubbing.

Additional features and advantages of the invention will become apparent to those skilled in the art upon consideration of the following detailed description of a preferred embodiment exemplifying the best mode of carrying out the invention as presently perceived. The detailed description particularly refers to the accompanying drawing.

The invention is described in greater detail hereinafter relative to an embodiment shown in the drawing, which diagrammatically represents a plant for producing pig-iron.

BRIEF DESCRIPTION OF THE DRAWING

The drawing is a diagrammatic representation of a plant for producing pig iron in accordance with this invention.

DESCRIPTION OF PREFERRED EMBODIMENT

The plant contains a reduction shaft furnace 1 constructed in per se known manner, to which is supplied from above via a not shown inlet iron ore and optionally fluxing agents. Reducing gas is supplied to the melt-down gasifier 2 from below to the reduction shaft furnace 1. The melt-down gasifier 2 once again receives the sponge iron Produced by the reduction of iron ore and Produces therefrom a pig-iron melt and for this purpose coal and oxygen are supplied to gasifier 2. The coal can be constituted by low-grade coke or high temperature carbonized coke.

The top gas of the reduction shaft furnace is brought via a line 3 into a scrubber 4 and is then mostly supplied, i.e. approximately 50 to 95% and preferably 85, to a $CO_2$ scrubber 6 via a compressor 5. The gas leaving the $CO_2$ scrubber 6 and which is free from $CO_2$ and $H_2O$ initially passes into a line 7 and from there into three branch lines 8, 9, 10. The treated top gas of the reduction shaft furnace removed via branch line 8 is used as a cooling gas for the gas leaving the melt-down gasifier 2. It cools this gas from approximately 1000° C. approximately 850° C. In branch line 9, the treated top gas is used as a conveying gas for the dust separated in a cyclone separator 11 on the gas produced in the melt-down gasifier 2 and returned to the latter. The reducing gas is firstly passed via cyclone separator 11 and a line 12 and secondly directly via a line 13 from melt-down gasifier 2 to the reduction shaft furnace 1. The remainder of the treated gas is supplied via branch line 10 to the $O_2$ tuyere level of melt-down gasifier 2.

The top gas leaving scrubber 4 is only to a limited extent removed from the aforementioned circuit via line 14 as waste gas. This Portion is preferably kept as low as is required for removing the nitrogen supplied to the process. Particularly when using top quality coal, e.g. high temperature carbonized coke or anthracite, sufficient top gas can be returned by $CO_2$ scrubber 6 to ensure that substantially no surplus gas is discharged. Then only that surplus gas quantity is discharged as is required for removing the nitrogen. The consumption of coal and oxygen can be roughly halved, compared with the conventional process without any top gas return. When using low quality coal, i.e. coal with a high content of ash and volatile constituents, it is advantageous to heat the treated, returned top gas with a plasma burner, in order to obtain advantageous use values.

The purified top gas leaving the CO$_2$ scrubber 6 and consisting of the components H$_2$, CO and N$_2$, can be preheated in a heat exchanger prior to introduction into the melt-down gasifier 2. Preheating takes Place to a temperature in the range 300 to 600° C. and preferably 400° C. Preheating to higher temperatures is not advisable, because it would lead to decomposition of CO. The final heating then takes Place in melt-down gasifier 2.

If a fluidized bed is formed in the melt-down gasifier it is also advantageous to introduce the treated top gas into the gasifier at roughly half the height of the fluidized bed.

It is also advantageous to produce sufficient surplus gas to enable the compressor of the O$_2$ plant to be operated and/or steam for CO$_2$ scrubbing to be produced.

I claim:

1. In the process for producing pig iron in which iron ore is reduced in a reduction shaft furnace issuing a top gas containing CO$_2$ and a sponge iron obtained as a result thereof is substantially passed through a fluidized bed formed within a melt-down gasifier above an O$_2$ tuyere, a gas and a carbon carrier being introduced into said melt-down gasifier, and a reducing gas produce din said melt-down gasifier being introduced as the reducing gas into said reduction shaft furnace; the improvement comprising the steps of compressing and at least partially scrubbing the CO$_2$ from the top gas issued from said reduction shaft furnace, and then introducing at least a portion of this scrubbed and compressed top gas into the melt-down gasifier at the O$_2$ tuyere level below the fluidized bed.

2. The process of claim 1 further comprising the step of preheating the scrubbed and compressed top gas introduced into the melt-down gasifier at the O$_2$ tuyere level below the fluidized bed to a temperature of between about 300° C. to 600° C. prior to said introduction.

3. The process of claim 2 wherein the temperature of the gas upon preheating is about 400° C.

4. The process of claim 1 further comprising the step of introducing an additional portion of the scrubbed and compressed top gas as a cooling gas into the stream of reducing gas passing into the reduction shaft furnace.

5. The process of claim 4 further comprising the step of controlling the amount of the additional portion of the scrubbed and compressed top gas so as to cool said stream of reducing gas passing into the reduction shaft furnace to a temperature of about 850° C.

6. The process of claim 1 further comprising the step of releasing a sufficient amount of the top gas issuing from the reduction shaft furnace to remove any nitrogen from the process.

* * * * *

UNITED STATES PATENT AND TRADEMARK OFFICE
CERTIFICATE OF CORRECTION

PATENT NO. : 5,043,011

DATED : August 27, 1991

INVENTOR(S) : Rolf Hauk

It is certified that error appears in the above-identified patent and that said Letters Patent is hereby corrected as shown below:

On the title page, under item "[30] Foreign Application Priority Data", please delete "Feb. 5, 1986 [DE] Fed. Rep. of Germany 3603894" and insert therefor --Oct. 17, 1984 [DE] Fed. Rep. of Germany 3438487.1--;

At column 3, line 21, please delete "substantially" and insert therefor --subsequently--; and At column 3, line 24, please delete "produce din" and insert therefor --produced in--.

Signed and Sealed this

Nineteenth Day of May, 1992

Attest:

DOUGLAS B. COMER

*Attesting Officer*     *Acting Commissioner of Patents and Trademarks*